United States Patent
Shin

(10) Patent No.: US 7,742,085 B2
(45) Date of Patent: Jun. 22, 2010

(54) ZOOM METHOD OF A DIGITAL CAMERA BASED ON EXTRACTED VALUES

(75) Inventor: Jun Yong Shin, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1502 days.

(21) Appl. No.: 10/731,025

(22) Filed: Dec. 10, 2003

(65) Prior Publication Data

US 2004/0119852 A1 Jun. 24, 2004

(30) Foreign Application Priority Data

Dec. 12, 2002 (KR) ............... 10-2002-0079248

(51) Int. Cl.
    *H04N 5/262* (2006.01)
(52) U.S. Cl. .............. 348/240.99; 348/208.6; 348/211.9; 348/240.1; 348/223.1; 348/222.1
(58) Field of Classification Search .......... 348/208.6, 348/211.9, 240.99, 240.1, 240.2, 240.3, 347, 348/222.1, 223.1
    See application file for complete search history.

(56) References Cited

U.S. PATENT DOCUMENTS

| 4,544,064 A * | 10/1985 | Felder ................ 209/583 |
| 5,008,946 A | 4/1991 | Ando .................. 382/2 |
| 5,835,641 A * | 11/1998 | Sotoda et al. ........... 382/291 |
| 6,297,846 B1 * | 10/2001 | Edanami ............... 348/239 |
| 6,323,898 B1 * | 11/2001 | Koyanagi et al. .......... 348/169 |
| 6,535,223 B1 * | 3/2003 | Foley .................. 345/629 |
| 7,324,246 B2 * | 1/2008 | Enomoto ............... 358/538 |
| 2002/0013161 A1 * | 1/2002 | Schaeffer et al. ........... 455/557 |
| 2002/0122121 A1 * | 9/2002 | Fujii et al. .............. 348/240 |

FOREIGN PATENT DOCUMENTS

| CN | 1201954 | 12/1998 |
| EP | 0 863 475 A2 | 9/1998 |
| EP | 0 863 475 A3 | 9/1998 |
| JP | 09-065197 | 3/1997 |
| JP | 2000-069345 | 3/2000 |
| KR | 1019970056971 | 7/1997 |
| KR | 1020000037653 | 7/2000 |

OTHER PUBLICATIONS

Chinese Office Action dated Dec. 1, 2006.
Qian R. J. et al., "A Robust Real Time Face Tracking Algorithm", vol. 1, Oct. 1998, pp. 131-135, XP010308856.
European Search Report dated Jul. 13, 2006.

* cited by examiner

*Primary Examiner*—Jason Chan
*Assistant Examiner*—Usman Khan
(74) *Attorney, Agent, or Firm*—KED & Associates, LLP

(57) ABSTRACT

A zoom method of a small digital camera is provided that includes searching a center search line of a photographic screen according to a set photographic mode and searching upper and lower lines based on the center search line so as to extract a color average value and a deviation of a photographic object. A size of a photographic object may be calculated based on the average value and the deviation. A zoom ratio may be set according to a size of the photographic object. A portrait mode and a text mode may be implemented by software without influencing a size of a mobile communication terminal and so as to fast process the zoom function.

25 Claims, 4 Drawing Sheets

ZOOM METHOD OF A DIGITAL CAMERA BASED ON EXTRACTED VALUES

This application claims priority from Korean Patent Application No. 79248/2002, filed Dec. 12, 2002, the subject matter of which is incorporated herein by reference.

BACKGROUND OF THE INVENTION

1. Field of the Invention

The following description relates to a zoom method of a small digital camera. More particularly, the following description relates to a small digital camera attached to a mobile communication terminal that automatically zooms according to a photographing mode, such as a portrait mode and a text mode.

2. Background of Related Art

A camera may provide a zooming function capable of enlarging/reducing an image of a subject based on a user's need. The zooming function may be divided into an optical zoom and a digital zoom. The optical zoom is for enlarging/reducing an image based on movement of a zoom lens back and forth. The digital zoom is for enlarging/reducing an image by calculating (and interpreting) a distance on a computer.

A general digital camera may not have a limitation of body size so that both the optical zoom and the digital zoom are adopted therein. The digital camera may automatically zoom according to a photographic mode.

In an automatic zoom process, various photographic modes (e.g., portrait, party, night view, close up, black and white, back light, scene, text, and etc.) may be provided in the digital camera, and an optimum exposure, a focus, a white balance, etc. may be automatically controlled according to photographic surroundings (or a subject). The portrait mode may be for photographing a natural portrait by closing up a figure and making voluminous in a clean background state. The back light mode may be for not generating a shadow of a figure at the time of photographing against the light. The text mode may be used for photographing letters or a simple text and storing these features.

In the automatic zoom process, the digital camera may automatically control a focus by using a through-the-lens (TTL) phase difference detection method, a contrast detection method, a sound wave detection measurement method, an infrared ray measurement method, etc.

The TTL phase difference detecting method is a method for measuring values of a subject through two optical devices (having different positions) and focalizing towards a direction that minimizes a difference of the values.

The contrast detecting method is a method for focalizing by comparing darkness between each image inputted through two range finders. The sound wave detection measurement method is for measuring a distance and controlling a focus by using the time for an ultra sound wave irradiated on a subject to return.

The infrared ray measurement method is for irradiating the infrared ray towards a subject and calculating a distance to the subject through an angle between a reflection light and an irradiation light of the subject and then controlling a focus by using a light source of an infrared ray irradiated on an infrared ray subject and an infrared ray reaction optical device that receives a reflection light reflected from the subject.

In order to implement the automatic focus controlling method, a distance measuring device is attached by hardware. However, a small digital camera attached to a mobile communication terminal has size limitations as compared to a general digital camera such that only a hand-operated digital zoom function may be provided for the small digital camera. That is, the small digital camera of a mobile communication terminal may provide a hand digital zoom function without any automatic focus controlling method as in general digital cameras and thereby the problems of the various photographic modes may not be automatically provided.

In small digital cameras of mobile communication terminals, it is difficult to implement an automatic focus controlling function according to a photographic mode using a hardware distance measuring device due to size limitations. Additionally, attaching the hardware distance measuring device to the small digital camera of the mobile communication terminal not only prevents a corresponding mobile communication terminal from becoming small but also increases the material cost.

SUMMARY OF THE INVENTION

An object of the invention is to solve at least the above problems and/or disadvantages and to provide at least the advantages described hereinafter.

Embodiments of the present invention may provide a zoom method for a mobile communication device having a small digital camera (hereinafter also called a digital camera) capable of implementing a specific photographing mode such as a portrait mode and a text mode.

Embodiments of the present invention may also provide a zoom method of a small digital camera capable of fast zoom-processing (without a hardware limitation) by implementing a specific photographic mode using software.

Embodiments of the present invention may provide a zoom method of a small digital camera that includes searching a center search line of a photographic screen according to a set photographic mode, and searching upper and lower lines based on the center search line so as to extract a color average value and a deviation value of a photographic object. A size of a photographic object may be calculated based on the average value and the deviation value. A zoom ratio may be set according to a size of the photographic object.

Embodiments of the present invention may provide a zoom method of a small digital camera that includes preprocessing a photographed screen according to a set photographic mode, setting a center search line of the photographic screen, and performing a line scan. A predetermined number of upper and lower lines may be searched based on the center search line. A color average value and a deviation of a photographic object may be extracted. A size of the photographic object may be judged based on the average value and the deviation, and a judgment may be made whether the photographic object is a normal region or not. The calculated size of the photographic object may be compared with a reference value and a zoom ratio may be set. The zoom ratio may be applied to the photographic object.

Embodiments of the present invention may also provide a zoom method for a small digital camera in a mobile communication terminal. This may include selecting/setting a portrait mode and preprocessing a photographic screen. A center search line of a photographic screen may be searched and a photographic object may be detected. Upper and lower search lines may be searched based on the center search line. An average value and a deviation of a skin color of the photographic object may be extracted. A size of a face region may be calculated based on the average value and the deviation of the skin color. The calculated size of the face region may be compared with a reference value. A zoom ratio may be calculated and applied to the photographic screen.

Embodiments of the present invention may provide a zoom method for a small digital camera in a mobile communication terminal. This may include selecting/setting a text mode, preprocessing a photographic screen, zooming the photographic screen to a maximum degree, and enlarging a text to the maximum size. A center search line of the photographic screen may be searched so as to detect a text. Upper and lower search lines are searched based on the center search line so as to detect an average value of a stroke thickness of the text. A size of the text may be calculated based on the average value of the stroke thickness of the text. The calculated size of the text may be compared with a reference value and a zoom ratio may be calculated. The calculated zoom ratio may be applied to the photographic screen.

The foregoing and other objects, features, aspects, advantages and embodiments of the present invention will become more apparent from the following detailed description when taken in conjunction with the accompanying drawings.

BRIEF DESCRIPTION OF THE DRAWINGS

The following represents brief descriptions of the drawings in which like reference numerals refer to like elements and wherein.

DETAILED DESCRIPTION OF PREFERRED EMBODIMENTS

Figure 1:
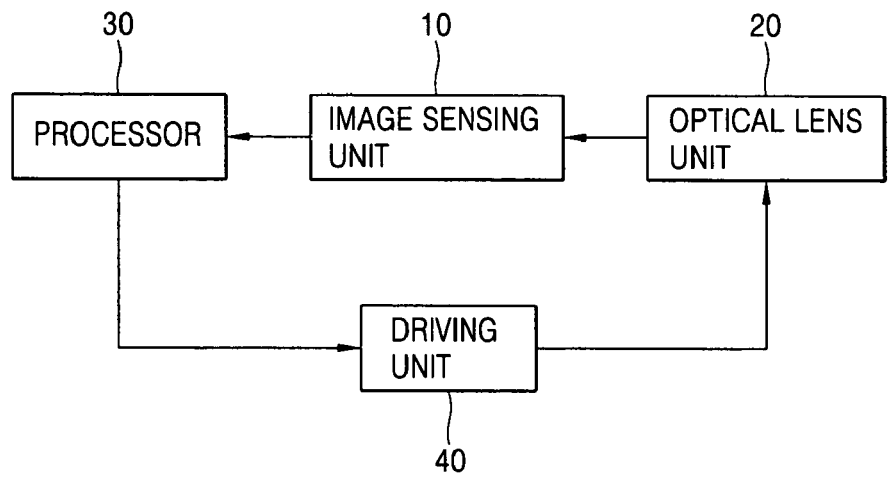
FIG. 1 is a block diagram of a small digital camera according to an example embodiment of the present invention.

FIG. 1 is a block diagram of a small digital camera according to an example embodiment of the present invention. This small digital camera may be provided within a mobile communication terminal, for example.

The small digital camera may include an image sensing unit 10 for converting optical image information into electric information, an optical lens unit 20 for focusing an image at the image sensing unit 10, and a processor 30 for processing the electric image information of the image sensing unit 10. A driving unit 40 may be provided for driving a zoom lens such as the optical lens unit 20 and using an optical zoom function.

At the time of photographing by applying only a digital zoom, the image sensing unit 10, the optical lens unit 20, and the processor 30 of the small digital camera may be used. At the time of photographing by applying an optical zoom, the driving unit 40 may also be used.

The small digital camera according to an example embodiment the present invention may have a construction similar to a general digital camera except the driving unit without an additional distance measuring device, and image-processing by a software digital zoom so as to provide a method for implementing a mode setting function (e.g. such as a portrait mode and a text mode).

Figure 2:
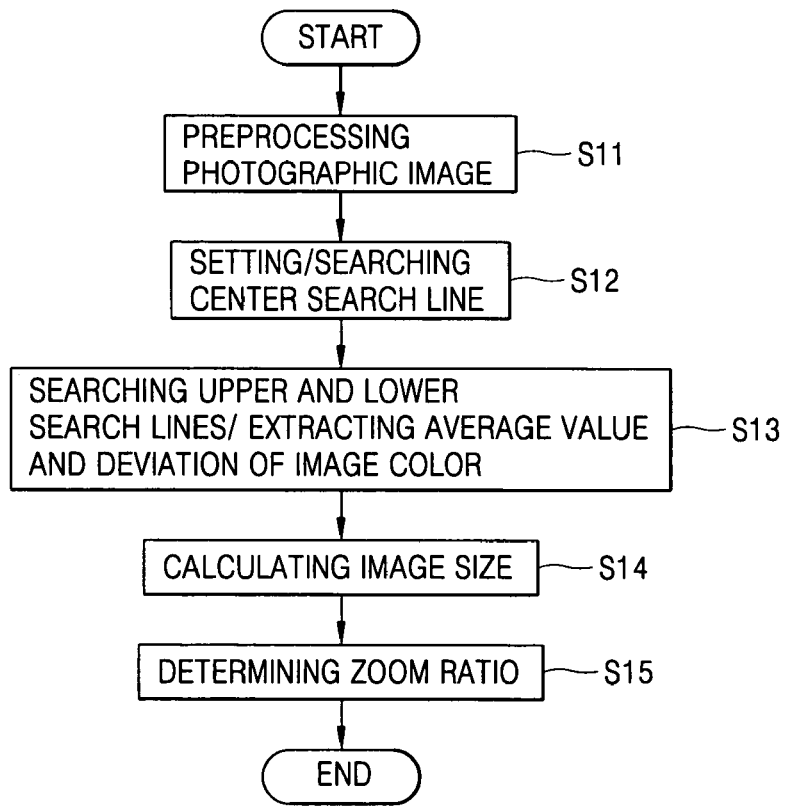
FIG. 2 is a flowchart showing a zoom method of a small digital camera according to an example embodiment of the present invention.

FIG. 2 is a flowchart showing a zoom method of a small digital camera according to an example embodiment of the present invention. As shown, the method may include preprocessing a photographed image according to a set photographic mode (S11), setting a center search line and searching a region of the center search line (S12). Upper and lower search lines may be searched based on the center search line so as to extract a color average value and a deviation of an image (S13). A size of an image may be calculated based on the average value and the deviation(S14). The size of an image may be compared with a reference value of a corresponding photographic mode so as to determine a zoom value (S15).

The portrait mode may be for photographing an upper part of a man's body, which can be used as a demonstration picture in a mobile communication terminal. The text mode may be for photographing maximum characters in a screen in a state to maintain readability.

Figure 3A:
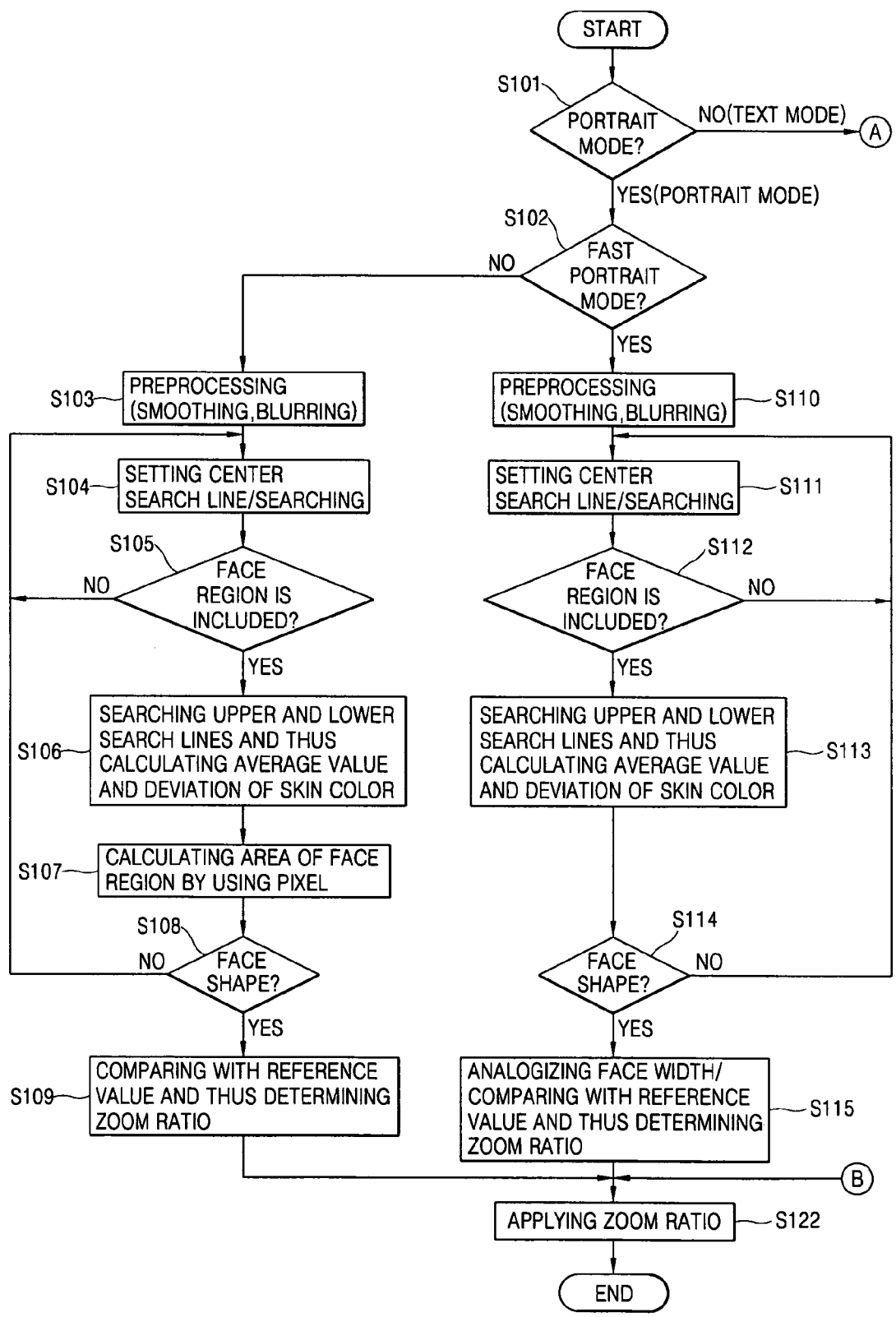
FIGS. 3A and 3B are flowcharts showing a zoom operation of a small digital camera in a portrait mode and a text mode according to an example embodiment of the present invention.
Figure 3B:
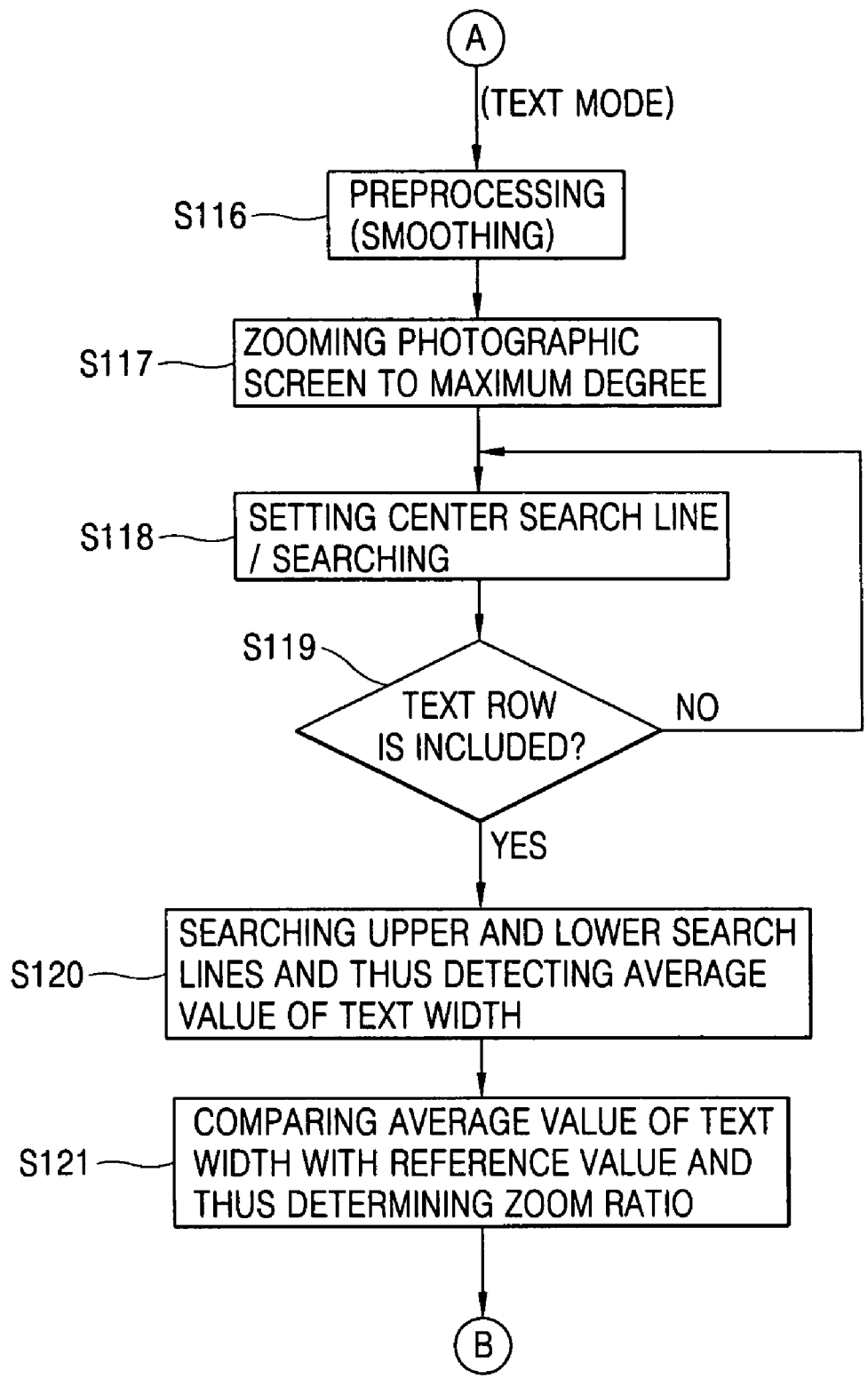
Figure 4:
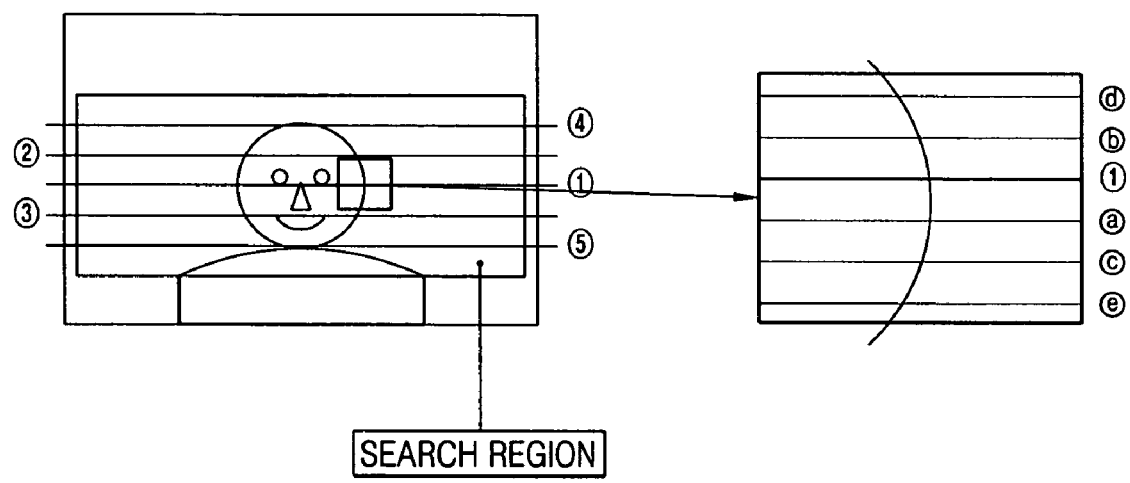
FIG. 4 is an exemplary view for explaining an operation of the portrait mode according to an example embodiment of the present invention.

FIGS. 3A and 3B are flowcharts showing a zoom operation of a small digital camera in a portrait mode and a text mode according to an example embodiment of the present invention. FIG. 4 is an exemplary view for explaining an operation of the portrait mode according to an example embodiment of the present invention.

The portrait mode may be for automatically zooming a size of an upper part of a body of a photographic object to be displayed on a screen of a mobile communication terminal. The portrait mode may analogize a size of a photographic object in a photographic screen by smoothing or blurring inputted digital image, and thus automatically digital zoom-processing.

An optimal size in the photographic screen for zoom-processing the photographic object can be set as a default at a time of manufacturing a mobile communication terminal or can be set by a user.

The portrait mode can be divided into a normal (or general) portrait and a fast portrait mode according to a zoom-processing speed. In the fast portrait mode, a predetermined algorithm may be applied for fast judging a face shape of a photographic object.

When setting a general portrait mode using a user's menu in a mobile communication terminal (S101, S102), the small digital camera performs a preprocessing for minimizing error generation of a photographic screen due to noise, shadow, and etc. (S103). In preprocessing, image noise generated at the photographic screen may be removed through a smoothing filter and a shadow influence of a nose and glasses in the photographic object's face may be minimized through a blurring method. The blurring method may be for average-processing an entire screen using a window of a certain size and then blurring the entire screen.

As shown in FIG. 4, the preprocessed photographic screen may be line-scanned in an order of 1→2→3→4→5 so as to search a region corresponding to a skin color. At the time of a successful search, an average value and a deviation of the skin color of the photographic object, and a face size may be extracted based on the search results. The extracted average value and the deviation of the skin color may be used as references to judge a face region of the photographic object.

That is, the photographic object is generally positioned at a center at a time of photographing in the portrait mode. A center 1 of the screen may be set as a center search line and line scanning may be performed (S104). When a face region is detected through the line scanning (S105), the face region is searched by moving a search line (having a predetermined gap) up and down based on the center search line. An average value and a deviation of a skin color of the photographic object may thereby be calculated (S106). By using the extracted average value and the deviation of the skin color, the number of pixels distributed within a range of a constant deviation from the average value may be counted and then a face area of a photographic object in the currently photographed screen may be calculated (S107).

It is then judged (or determined) whether the extracted region is a face shape or not (S108). If the region is judged not to be a face shape, then a center search line is again set and upper and lower search lines are searched based on the center search line (or reset center search line) so as to calculate a face area (S104 to 107). After repeating a process for analogizing a face region more than a predetermined number of times, it is judged (or determined) that the photographic object is not a face and a message processing may be performed so that the user can directly control the zoom, and such that the digital camera is converted into a user hand mode.

On the other hand, when the extracted region is judged (or determined) to be a face shape (S108), an area of the face region is compared with a preset size of a portrait so that a zoom value (or zoom ratio) may be determined (S109). Then, the digital camera zoom-processes the photographic object by applying the zoom ratio (S122).

When setting the fast portrait mode using a user's menu in a mobile communication terminal (S101, S102), the digital camera may perform a preprocessing for minimizing error generation of a photographic screen as in the general portrait mode. (S110).

A center search line positioned at a center of the preprocessed photographic screen may be line scanned (S111) so as to judge (or determine) whether a face region is included (S112).

When a region is judged as a face shape, the face region may be detected by moving search lines a, b, c, d, e, . . . having smaller gaps than the search lines 2, 3, 4 and 5 of the general portrait mode. Also, based on the search result, an average value and a deviation of a skin color of the photographic object are calculated and a length variation of the face region extracted at each search line may be certified (S113).

It is then judged (or determined) whether a region searched through the length variation is a face shape (S114). If the region is judged not to be a face shape, a center search line is again set and upper and lower search lines that are minutely divided are searched based on the center search line (or reset center search line) so as to calculate an average value and a deviation of a skin color (S111-S113).

When the searched region is judged (or determined) to be a face shape, a part having a widest skin color region among each searched line is judged as a face width of the photographic object and is compared with an optimal face size information preset by a user (or a preset portrait size) so as to determine a zoom value (or zoom ratio) (S115). Then, the digital camera zoom-processes the photographic object by applying the zoom ratio (S122).

When photographing a picture including a man's face, the above described zoom method may be applied since an area having no skin color (e.g. eyes, a lip, and hair) has little difference according to a man even if a difference may exist more or less according to a man's face size. When the photographic object wears sunglasses or is bald, an automatic zoom may be made even if a face size is small or large. When an automatic zoom may not be properly performed since a photographic background is the same as a skin color, then a message processing may be performed for the user to recognize. The camera may be converted into a user hand mode so that the user can perform a direct zoom control.

When a plurality of subjects are to be photographed, a number of the photographic object can be judged based on a searched skin color. When several skin colors more than a certain length exist on one search line and skin colors of the same pattern are detected on the search lines, then the number of the skin colors may be stored.

By searching upper and lower lines for all regions that are judged to be a face region, sizes of face regions are respectively calculated and then it is certified that each face size is distributed in a deviation of a corresponding skin color so as to obtain an average value thereof.

By using the average value, a size of a photographic object in a screen may be analogized and an automatic zoom processing may be performed based on a number and a face size of the photographic object so as to enable a portrait mode even when more than two photographic objects exist in one screen.

A zoom method of a mobile communication terminal having a small digital camera in a text mode will now be explained with respect to FIG. 3B. In the text mode, a background of a photographic object may be white and the text may be black. Even when the background color and the text color of the photographic object are not white and black, a text search may be possible. However, when the background color completely contrasts with the text color, a search efficiency may be enhanced.

When photographing text using a digital camera, the existence of text can be judged based on color contrast. However, in order to judge the characters of which the text of a photographic object is composed, a zoom-processing may be performed so that a stroke thickness of each character can be more than 1 pixel. The stroke thickness of the text is not fixed as 1 pixel, but can be set based on a user's desired size.

As shown in FIG. 3B, when photographing text in the text mode using a mobile communication terminal (S101), a preprocessing may be performed in order to minimize error generation of a photographic screen (S116). The preprocessing of the text mode may be performed with a smoothing process for removing image noise that exists on a photographic screen through a smoothing filter.

The preprocessed photographic screen may be zoomed to a maximum degree so as to maximize a text size (S117). A center search line 1 may be set as in the above described portrait mode, and a line scanning may be performed based on the search line (S118).

Figure 5:
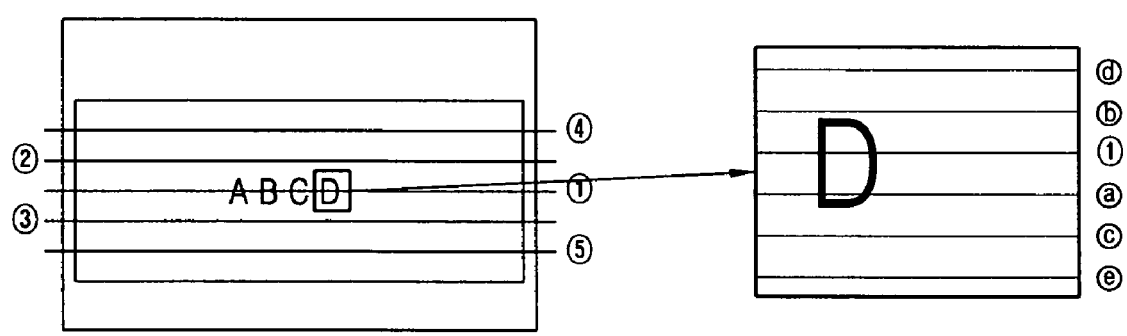
FIG. 5 is an exemplary view for explaining an operation of the text mode according to an example embodiment of the present invention.

When a region that is judged as a text row is detected by the search result (S119) as shown in FIG. 5, a text region may be searched by moving search lines a, b, c, d, e, . . . having a predetermined gap up and down from the center search line 1 so as to detect a pixel average value of a text stroke (S120).

By comparing the detected average value of a text stroke with a user's preset value or a preset reference value, a zoom ratio may be determined (S121). The small digital camera zoom-processes the photographic object by applying the zoom ratio (S122). The reference value may be a value for including a maximum text in one screen by setting a width of a text stroke as 1 pixel.

In a zoom method of a digital camera according to an example embodiment of the present invention, the portrait mode and the text mode are provided for fast processing a zoom in a corresponding photographic mode and improving efficiency of consecutive photographing.

In a zoom method of a digital camera, a software digital zoom is provided so as to apply the portrait mode and the text mode without affecting a size of a mobile communication terminal.

The zoom method of a small digital camera may also be applied to small electric home appliances (or other objects) to enhance an added value of a product and increase the user's satisfaction degree.

The foregoing embodiments and advantages are merely exemplary and are not to be construed as limiting the present invention. The present teaching can be readily applied to other types of apparatuses. The description of embodiments of the present invention are intended to be illustrative, and not to limit the scope of the claims. Many alternatives, modifications, and variations will be apparent to those skilled in the art.

What is claimed is:

1. A zoom method comprising:
searching a center search line of a photographic screen, wherein the center search line comprises a horizontal axis at an approximate center of the photographic screen;
searching each of a plurality of upper search lines from the center search line;
searching each of a plurality of lower search lines from the center search line;
extracting a color average value and a deviation of a photographic object within the photographic screen for each of the plurality of upper search lines and the plurality of lower search lines;
determining a size of photographic object based on the extracted color average value and the extracted deviation for each of the plurality of upper search lines and the plurality of lower search lines, wherein determining the size of the photographic object includes determining a number of pixels that exist within a range of a certain deviation from an average value of a specific color and determining an area of the photographic object based on the determined number of pixels; and
setting a zoom ratio by comparing the determined size of the photographic object with a reference value or with a preset size.

2. The method of claim 1, wherein determining the size of the photographic object comprises:
analogizing a size of the photographic object by calculating the average value and the deviation; and
judging whether the photographic object is a normal region corresponding to a photographic mode.

3. The method of claim 2, further comprising converting a digital camera into a user hand mode so that a user can perform a direct zoom processing when the photographic object is not a normal region.

4. The method of claim 1, wherein searching the center search line comprises:
setting a photographic mode;
preprocessing the photographic screen; and
performing a line scanning at a region of the center search line.

5. The method of claim 4, wherein preprocessing the photographic screen comprises performing one of a smoothing method and a blurring method for minimizing error generation.

6. The method of claim 1, further comprising detecting the photographic object by the searching of the center search line.

7. The method of claim 1, wherein searching each of the plurality of upper search lines and each of the plurality of lower search lines comprises performing a line-scanning, and searching lines set with a predetermined gap up and down one line by one line.

8. The method of claim 1, wherein when the photographic object is not detected, the method further comprises:
resetting the center search line;
resetting upper search lines and lower search lines based on the reset center search line; and
searching each of the plurality of upper search lines and the plurality of lower search lines based on the reset search line.

9. The method of claim 1, wherein the reference value comprises one of a value manually preset by a user and a value preset based on a screen contrast.

10. A zoom method comprising:
searching a plurality of lines of a photographic screen by alternatively searching lines with a pre-determined gap up or down one line by one line;
for each of the plurality of lines, extracting a color average value and a deviation of a photographic object on the photographic screen;
determining a size of a photographic object based on the extracted color average value and the extracted deviation for each of the plurality of lines, wherein determining the size of the photographic object includes determining a number of pixels that exist within a range of a certain deviation from an average value of a particular color and determining an area of the photographic object based on the determined number of pixels;
determining a zoom ratio by comparing the determined size of the photographic object and a reference value; and
applying the determined zoom ratio to the photographic object.

11. The method of claim 10, further comprising:
setting a center search line of the photographic screen, and wherein the extracting includes performing a line scan of the center search line to extract the color average value and the deviation.

12. The method of claim 10, further comprising:
preprocessing the photographic screen according to a set photographic mode.

13. The method of claim 12, wherein the photographic mode comprises one of a portrait mode and a text mode.

14. The method of claim 12, wherein the preprocessing comprises one of a smoothing method and a blurring method for minimizing error generation.

15. The method of claim 11, wherein the center search line comprises a horizontal axis at an approximate center of the photographic screen for performing a line scan in order to detect the photographic object.

16. The method of claim 11, further comprising resetting the center search line when the photographic object is not detected along the center search line, and wherein the extracting includes performing a line scan based on the reset center search line.

17. The method of claim 10, further comprising converting into a user hand mode so that a user can perform a direct zoom processing when the photographic object is not a normal region.

18. The method of claim 10, wherein the reference value comprises one of a value preset manually by a user and a value preset based on a screen contrast.

19. A zoom method of a digital camera apparatus associated with a mobile communication terminal, the method comprising:
searching a center search line of a photographic screen to detect a photographic object, wherein the center search line is approximately at a center of the photographic screen;

searching a plurality of upper search lines of the center search line to extract an average value and a deviation of a skin color of the photographic object for each of the upper search lines;

searching a plurality of lower search lines of the center search line to extract an average value and a deviation of a skin color of the photographic object for each of the lower search lines;

determining a size of a face region based on the extracted average value and the extracted deviation of the skin color for each of the plurality of upper search lines and based on the extracted average value and the extracted deviation of the skin color for each of the plurality of lower search lines, wherein determining the size of the face region includes determining a number of pixels that exist within a range of a certain deviation from an average value of a skin color and determining an area of the face region based on the determined number of pixels;

comparing the determined size of the face region with a reference value;

calculating a zoom ratio based on the comparing; and applying the calculated zoom ratio to the photographic screen.

20. The method of claim 19, further comprising resetting a search line and searching the reset search line.

21. The method of claim 19, wherein searching the plurality of upper search lines and searching the plurality of lower search lines comprises alternatively searching lines set with a predetermined gap up and down one line by one line.

22. The method of claim 19, wherein determining the size of the face region further comprises:

analogizing a length of a longest search line as a face width by obtaining a length variation through search lines having a smaller gap than the upper and lower search lines.

23. The method of claim 19, wherein determining the size of the face region further comprises judging whether a calculated face region is a normal photographic object.

24. The method of claim 23, further comprising converting the digital camera into a user hand mode so that a user can perform a direct zoom processing when the determined face region is not a normal photographic object.

25. The method of claim 19, wherein when a plurality of skin colors more than a certain length exist along the center search line and skin colors of a same pattern are detected at adjacent upper and lower search lines, the method further comprises:

determining that a plurality of photographic objects exist;

extracting an average value and a deviation of a skin color for each photographic object that is determined to be a face;

determining an area of a face region by obtaining a number of pixels that exist within a range of a certain deviation from an average value of each skin color; and zooming a photographic screen with a preset zoom ratio based on the number of pixels and the determined area of the photographic objects.

* * * * *